(12) United States Patent
Rossetti et al.

(10) Patent No.: US 11,966,881 B2
(45) Date of Patent: Apr. 23, 2024

(54) SYSTEM AND METHOD FOR CONTROL AND AUDIT OF CHEMICAL PRODUCTS APPLICATION MADE BY VEHICLES

(71) Applicant: PERFECT FLIGHT ASSESSORIA E CONTROLE DE PULVERIZACAO LTDA, São João Boa Vista (BR)

(72) Inventors: Fernando Marcondes Rossetti, São João Boa Vista (BR); Kriss Corso E Silva, São João Boa Vista (BR)

(73) Assignee: Perfect Flight Assessoria E Controle De Pulverizacao Ltda, São João Boa Vista (BR)

( * ) Notice: Subject to any disclaimer, the term of this patent is extended or adjusted under 35 U.S.C. 154(b) by 822 days.

(21) Appl. No.: 16/997,437

(22) Filed: Aug. 19, 2020

(65) Prior Publication Data
US 2021/0012291 A1 Jan. 14, 2021

Related U.S. Application Data

(62) Division of application No. 15/580,499, filed as application No. PCT/BR2016/050155 on Jul. 4, 2016, now abandoned.

(51) Int. Cl.
*G05D 1/10* (2006.01)
*G05D 1/00* (2006.01)
(Continued)

(52) U.S. Cl.
CPC ......... *G06Q 10/1091* (2013.01); *G05D 1/104* (2013.01); *G06F 16/9024* (2019.01);
(Continued)

(58) Field of Classification Search
CPC ....... B25J 19/02; B25J 9/1679; A01C 21/005; A01C 7/06; A01C 7/102
See application file for complete search history.

(56) References Cited

U.S. PATENT DOCUMENTS 6,128,574 A 10/2000 Diekhans
8,386,129 B2 * 2/2013 Collins ................ G05D 1/0278
701/44
(Continued)

FOREIGN PATENT DOCUMENTS

WO 2010045350 4/2010
WO 2011134044 11/2011

OTHER PUBLICATIONS

International Search Report for Application No. PCT/BR2016/050155 dated Nov. 30, 2016; 3 pages.
(Continued)

*Primary Examiner* — Dalena Tran
(74) *Attorney, Agent, or Firm* — DITTHAVONG, STEINER & MLOTKOWSKI

(57) ABSTRACT

The present invention relates to a system for control and audit of chemical products application made by vehicles for the agriculture, pestilence, plague, or insects control, or other chemical applications in determined areas to receive these chemical products such the agrochemical application made by manned or unmanned vehicles, being these vehicles aerial, land or watercraft with the aim of treating soil and/or seeds and/or plants characterized by the system comprises a web server running an application; a database application; an internet communication method between the application cloud environment and its end users; desktop computers running web browsers; mobile devices to access the application through the internet; and a GPS device from where GPS files are collected by a device, being the GPS embedded in a vehicle where these files are used as input data for generating the final application reports which contains all detailed information about how much and in which areas (plots) the product was applied.

10 Claims, 4 Drawing Sheets

(51) Int. Cl.
  *G06F 16/901* (2019.01)
  *G06F 16/954* (2019.01)
  *G06Q 10/1091* (2023.01)
  *G07C 5/08* (2006.01)
  *H04W 4/021* (2018.01)
  *H04W 4/029* (2018.01)
  *G06K 7/14* (2006.01)

(52) U.S. Cl.
  CPC ......... *G06F 16/954* (2019.01); *G07C 5/0858* (2013.01); *H04W 4/021* (2013.01); *H04W 4/029* (2018.02); *G06K 7/1426* (2013.01)

(56) References Cited

U.S. PATENT DOCUMENTS 10,251,329 B2 * 4/2019 Foster ................... G05D 1/0219
  10,314,224 B2 * 6/2019 Turpin ................... G06Q 50/02
  10,368,475 B2 * 8/2019 Wolters ................ A01B 69/008
  10,754,342 B2 * 8/2020 Tomita ................. G05D 1/0274
  2012/0072922 A1   3/2012 O'Neil
  2013/0124239 A1   5/2013 Rosa et al.
  2017/0134167 A1   5/2017 Carter
  2018/0146612 A1 * 5/2018 Sauder ............. G06Q 10/06395

OTHER PUBLICATIONS

Written Opinion for Application No. PCT/BR2016/050155 dated Oct. 1, 2017; 4 pages.
Requirement for Restriction/Election issued in a parent U.S. Appl. No. 15/580,499 dated Dec. 20, 2019.
Non-Final Rejection issued in a parent U.S. Appl. No. 15/580,499 dated Mar. 19, 2019.

* cited by examiner

US 11,966,881 B2

SYSTEM AND METHOD FOR CONTROL AND AUDIT OF CHEMICAL PRODUCTS APPLICATION MADE BY VEHICLES

RELATED APPLICATIONS

The present application is a divisional of U.S. patent application Ser. No. 15/580,499 filed Dec. 7, 2017 which is a U.S. National Phase of international application No. PCT/BR2016/050155 filed Jul. 4, 2016.

TECHNICAL FIELD

The present invention relates to the field of chemical products application for the agriculture, pestilence, plague, or insects control, or other chemical applications in determined areas to receive these chemical products such the agrochemical application made by manned or unmanned vehicles, being these vehicles aerial, land or watercraft with the aim of treating soil and/or seeds and/or plants.

BACKGROUND OF THE INVENTION

Agricultural aviation is one of the possible applications of chemicals that has numerous advantages, such as: no contact with the ground, thus avoiding the kneading of culture and soil compaction; not cause stress in plants; early entry in the area, even after rain and immediate control of pests and diseases.

However, aerial application has its disadvantages, such as: disrespect to the contracted application range, causing the loss of efficiency of pesticides and exceeding the area limits; these limits when are not respected, can generate application on surrounding areas, permanent protection areas (APP), schools, water sources and others causing numerous losses to the environment, people and the producers.

The current application of chemicals made by tractors also presents problems with regard to failure to apply in relation to the area where the product should be applied and it was not applied by a tractor driver error and also problems with excess or lack of such chemical products application because such control is also made by the tractor driver.

Thus, both the land applications as the aerial applications of chemicals products used in agriculture, or even for the treatment and/or control pests in rural or urban areas, it is necessary to control both the vehicle's path used for the dump chemical product as well as the timing and amount of chemical product to be applied in a certain area.

The present system ensures that the land and the aerial space of the farm is traversed by the vehicle in the most efficient manner following an optimized predetermined path in opposition to a manual operation of an agricultural vehicle may result in gaps or the non-optimal use of fuel or agricultural materials.

SUMMARY OF THE INVENTION

One of the objectives of the invention is to provide a system and a method that identifies the following factors in the application of chemical products: what was the range of application used, if the limits of the pre-established application areas were respected, if applications were made duplicate, and if has applied the correct amount of product.

The system generates reports with all data above in hectares, thus allowing analyzing and quantifying the losses safely. When the report is generated to the producer, the system provides all exemplified data above. Another feature is the audit of the correct costs of the application of chemical products by means of vehicles in a certain area.

The system allows a clear and safe identification of the details of the losses arising from the misapplication of the chemical products, such as aerial and/or land applications of agrochemicals.

The system aims to solve the problem of product losses in the process of applying of chemical products in a certain area in a simply way.

The system allows the registration of companies that distribute products applied by air, land or water, the pilots (in the case of manned vehicles) and vehicles (such as aircraft) that provide services to the producer. It also allows the registration of all the plots of their georeferenced properties by importing GPS files of the vehicle responsible by distributing the agrochemical product.

Such system allows the monitoring of the distribution of chemical products by manned or unmanned land, aeronautical, or water vehicles, in rural or urban areas, as well as in forest areas.

The present system can also be applied in the application of seeds and any other products to being distributed by means of vehicles in a predetermined and georeferenced area.

The vehicle guidance system involves the reception of a position indication signal which allows a control unit on the vehicle to determine its position. Commonly, the position indication signal is taken from a Global Navigation Satellite System (GNSS) satellite based positioning system such as the American Global Positioning System (GPS) and/or the Russian GLONASS System and/or the European Galileo system signal or the more accurate differential satellite signal.

The system generates the application reports of chemical products based on files generated by GPS or similar system embedded in the vehicle. Thus, the report states in which plots the chemical product were applied, the products used and all the statistical results of the application.

The system performs hundreds of topographic calculations and displays the report ready in seconds allowing the producer to view the results on a computer screen, laptop, cell phone, palmtop, tablet, or any device that has remote access to the internet. This report can be saved or printed.

The system has the following features:
Application Management: through the system it is possible to have confidence that the product application range contracted by the producer was respected by the pilot and all the limits of the areas were respected;
Area and Cost control: The system provides an individual control for area informing, by report, which products were used, the costs of application and efficiency of the same;
Remote control: even if not present in the property, the producer receives notifications on your smartphone or any other mobile device with Internet access with the application report of these areas;
Control by property: regardless of the number of areas, the release of information in the system will be separated by properties or pre-established public areas enhancing the management of such areas;
Printed reports with QR-Code: the system allows printing reports with QR-Code that can be read by any smartphone or any other mobile device with internet access allowing access to the report in detail. Such reports can be provided with any technology that allows quick access to the information from the system; and Corrective measures: These measures are generated by the vehicle's GPS (or similar device) during application thereby achieving images of the flight or path of the aquatic or terrestrial application, and if it detects any product application error in the established area, corrective measures can be taken remotely by the system.

DETAILED DESCRIPTION OF THE INVENTION

The system described in the present invention was named as Perfect Flight system.

First Embodiment

Follows bellow a process overview of the use of the system in a first embodiment.

To use the Perfect Flight system, the user must follow some steps.

First, the raw GPS log files, of the embedded GPS in the vehicle, must be acquired from the GPS device. This can be done by using a flash drive directly connected to the device's USB port. The user must use the export function of the GPS embed system to copy the files to the flash drive. Once the files are available, it can be copied to the computer with internet access to the Perfect Flight system to make the transference of these files to the system.

The user must access the URL of the web system.

The user must provide his credentials (e-mail address and password) to login to the system.

The system will then check for the credentials and provide access in case it has been successfully validated.

Inside the web system, the user must register his application provider companies and its pilots/drivers.

Next, the user must register his farm properties or the area where the chemical product will be applied. Then the user can generate the application reports based on the GPS copied files through the Perfect Flight system.

Figure 1:
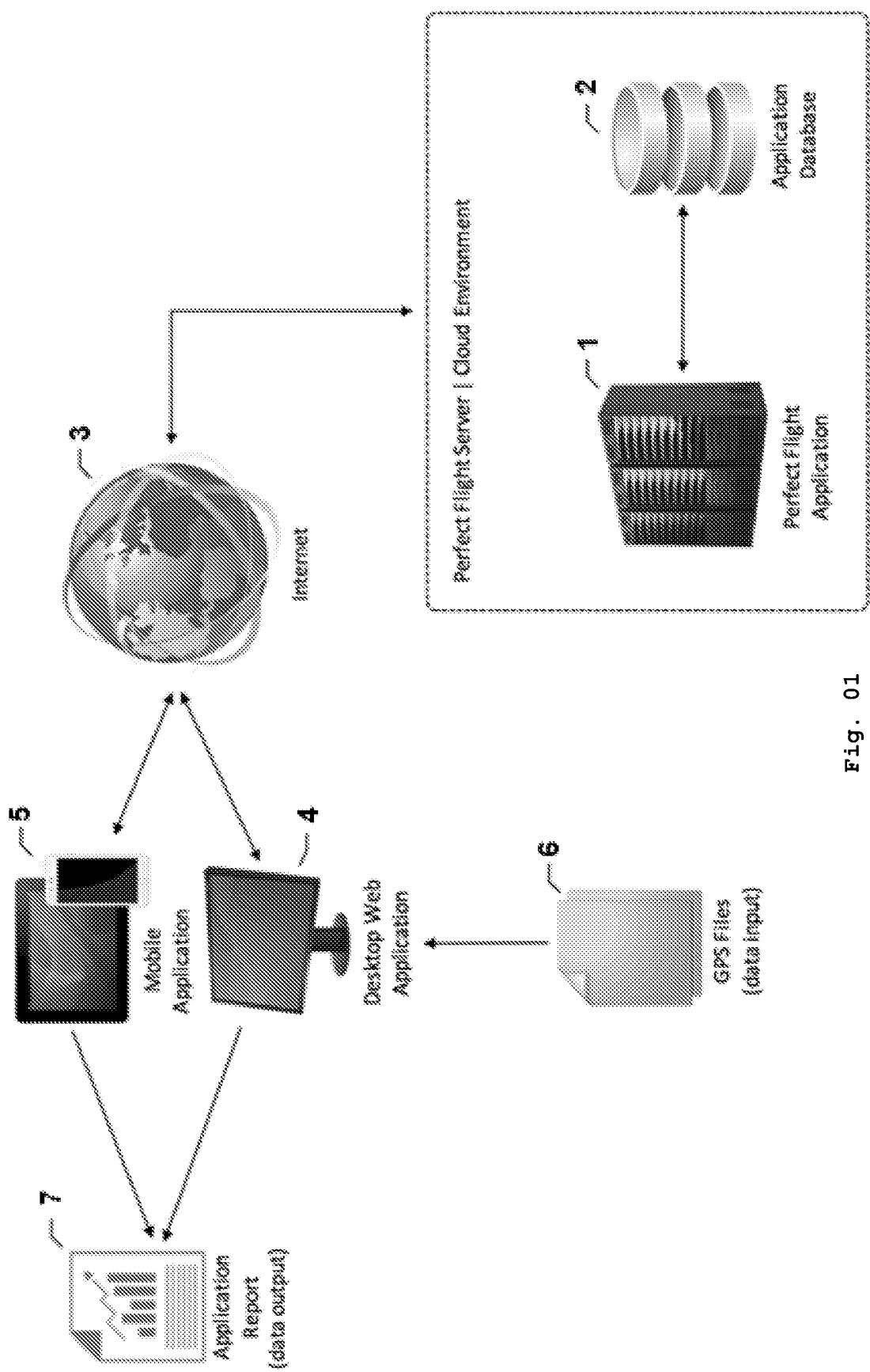
FIG. 1 shows the overall system architecture of the first embodiment of the present invention.

The diagram shown in FIG. 1 related with a first embodiment of the present invention describes how the application works and its parts and how each part connect with the others.

There is a web server running the Perfect Flight application (1). This web server also provides file system storage for this application.

There is a database application (2) responsible for all the information used in this application. This database server can be running inside the same physical server (1) or in another one.

The internet (3) is the provided communication method between the Perfect Flight cloud environment and its end users. Other remote communication systems can be used such radio communication systems.

This application can be accessed by desktop computers (4) running web browsers. In this desktop (4) access it is possible to upload the GPS collected files containing all the information necessary to generate the final application report (7).

This application is also accessible by mobile devices (5) such as smartphones and tablets, but it has limited features since it is not possible to upload the GPS files directly from mobile devices. In this case, the user is able to view previously generated reports as well as other related information.

A GPS device from where GPS files (6) are collected by the device used in the application method. It may be generated by GPS embedded into agricultural aircrafts or tractors. These files are used as input data for generating the final application reports (7).

The final product of this process is the final application report (7), which contains all detailed information about how much product was applied and in which areas (plots) on the ground. It also contains a financial information about the relation between products/dosage/costs for this application.

The report also shows a success rate for the application. The report information's are: property name, pilot, aircraft, total costs, success costs, application's beginning/ending date and time, average application speed, application spray width, total traveled distance, total plots area, total application area, external application costs, application rate, overlap area, success area, external area, not covered area and success rate.

Figure 2:
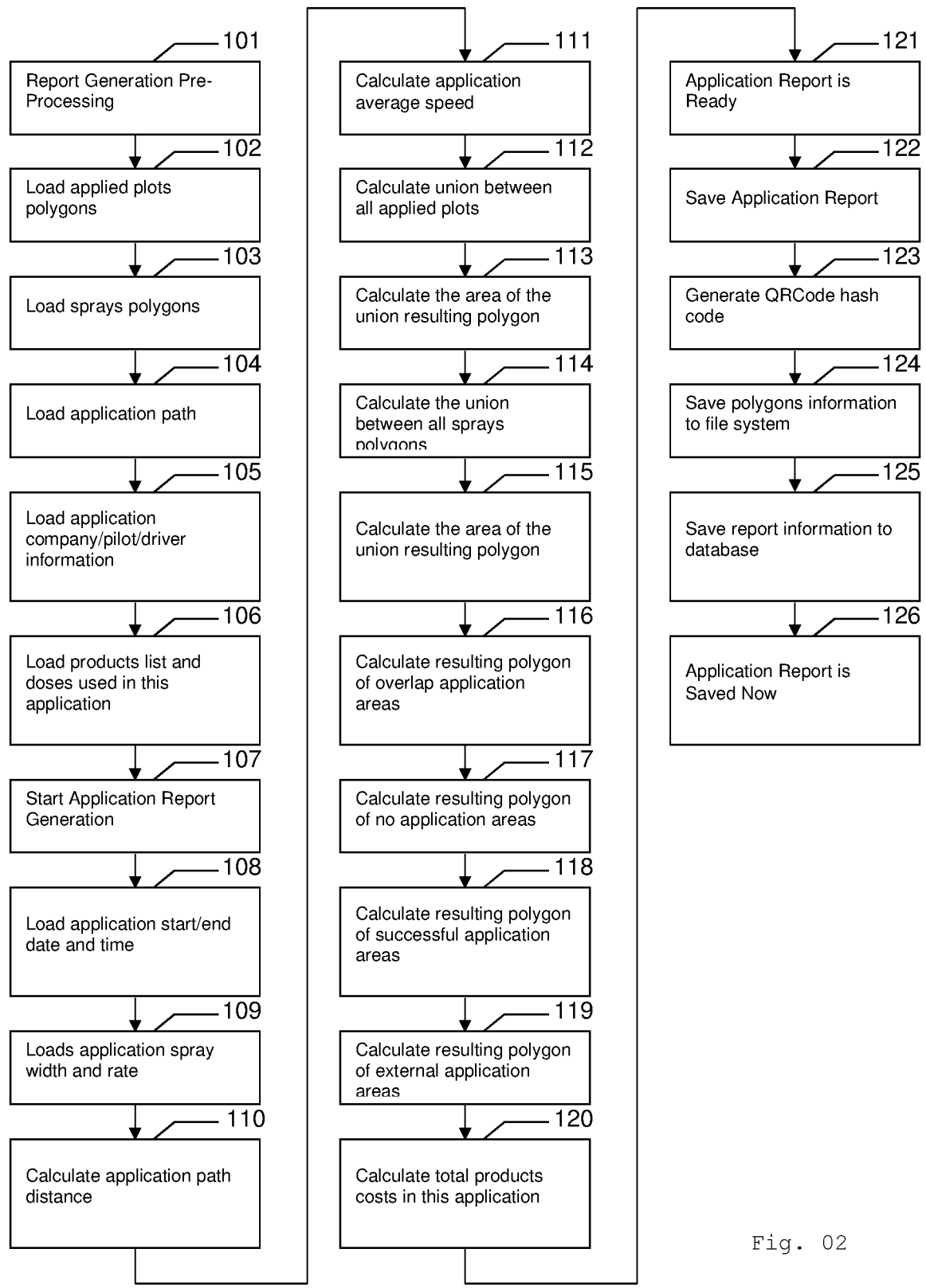
FIG. 2 shows the system detailed report generation flow of the first embodiment of the present invention.

FIG. 2 is a detailed step by step chemical product application and report generation flow. It describes how all the needed information is gathered and how the calculations are made in order to generate the final report (7) that constitutes a method for control and audit the chemical products application made by a vehicle.

In the step (101) the process starts by a pre-processing routine to initialize the application variables.

In the step (102), the user is prompted to inform which plots this application was supposed to be done. Next, the system will load, from the desktop web application (4) to the Perfect Flight Application (1) through the internet (3), each plot polygon area, based on previously georeferenced imported files.

In the step (103), the application's sprays polygons are loaded from the GPS input files (6). The raw GPS log files, of the embedded GPS in the vehicle, is acquired from the GPS device by using a flash drive directly connected to the device's USB port and the user must use the export function of the GPS embed system to copy the files to the flash drive and after that the user upload the GPS input files (6) to the Perfect Flight Application (1) from the desktop web application (4).

In the step (104), the chemical product application traveled path is also loaded from the GPS input files (6).

In the step (105), the information about company, pilot/driver information are also collected by the user.

In the step (106), the list provided by the user containing each applied product, dosage and costs is also loaded into memory for the financial report.

In the step (107), with all needed information collected from the desktop web application (4) by the user and loaded into memory at the Perfect Flight Application (1), the system can now start processing the application report (7).

In the step (108), the application beginning/ending date and time are read from the GPS input files (6).

In the step (109), the application's average spray width is loaded from the GPS input files (6).

In the step (110), the vehicle traveled distance is calculated by the traveled path from the GPS input file (6).

In the step (111), the chemical product application's average speed is calculated based on the GPS input file (6).

In the step (112), the system generates a new polygon based on the union between all the applied plots informed by the user. This is the supposed goal target area for the application and all next calculations are done based on this resulting polygon.

In the step (113), the area in hectares is calculated for this resulting polygon.

In the step (114), the system also generates a new polygon resulting by the union between all chemical product application sprays.

In the step (115), the area of the resulting application spray polygon is calculated.

In the step (116), calculate the resulting polygon for the overlap application spray areas. The overlap area id caused when the application is done more than twice in the same region, causing waste of applied products.

In the step (117), calculate the resulting polygon of no application area. This indicates areas that were not covered by any spray application.

In the step (118), the system can now calculate the successfully applied polygon. This indicates areas inside the plots informed by the user that actually were covered by the application.

In the step (119), the external application polygon is calculated and indicates areas outside the plots indicated by the user. It also represents waste of applied products.

In the step (120), based on all the calculated area information, the system can now generate the financial report, which indicates the total cost of this application and the cost represented by the success and wasted areas, as well as the cost per applied hectare.

In the step (121), the final report (7) is now processed and ready to be delivered to the end user, even by desktop (4) or mobile (5) access.

In the step (122), the system will save this report into the application database (2) in order to reduce loading time the next time the user tries to review this report. This is important, since the processing of the report involves heavy calculation.

In the step (123), a new identification hash code is generated for the report (7) and a QRCode is also created based on this hash code. The QRCode is displayed in the print form of the report (7). It is used to easily reopen the application report (7) in the computer (4) or mobile (5) device by simply reading the printed QRCode on the paper report (7). Reports can also be exported as PDF (Portable Document File) files for offline access outside the system.

In the step (124), all the resulting calculated polygons during the generation process are saved into application database (2) files in the server's file system. These files will be opened for later reviewing of the report (7).

In the step (125), the final calculated information is saved in the application database (2) which provides fast access to the most important information of the report (7) and also provides ease for the end user to find and filter generated reports.

Second Embodiment

Follows bellow a process overview of the use of the system in a second embodiment.

The difference between the first and the second embodiment is that on the first one the user input the data into the desktop web application (4), the pilot proceeds with the chemical product application into the plot area based on the georeferenced area that the user gave to the pilot, and, after the chemical product application the user get the GPS files (6) from the vehicle and upload it to the Perfect Flight application (1) to process and generates the final application report (7) with the audit results identifying if the pilot comply with the contracted about the area of application of the chemical product and the amount of product to be applied.

So, in the first embodiment of the present invention, the user will take providences after the application of the chemical products based on the audit of the vehicle GPS files (6) information.

In the second embodiment, the user will input the data into the desktop web application (4) that will transmit the information and parameters of the chemical product application pathway and amount of product to be delivered and the wide of the spray application to the Perfect Flight Application (1). The system will calculate the chemical product application plan and, by a remote communication system, will transmit the plan to the vehicle control unit (8) that will control the vehicle (9 to 12) actualizing its pathway plan based on the GPS embedded system. This vehicle could be manned or unmanned and its pathway will be remotely controlled by the vehicle control unit (8) that will control all the procedures of the chemical product application.

So, the second embodiment of the present invention control and correct the chemical product application in real time and remotely avoiding errors in the chemical product application.

Figure 3:
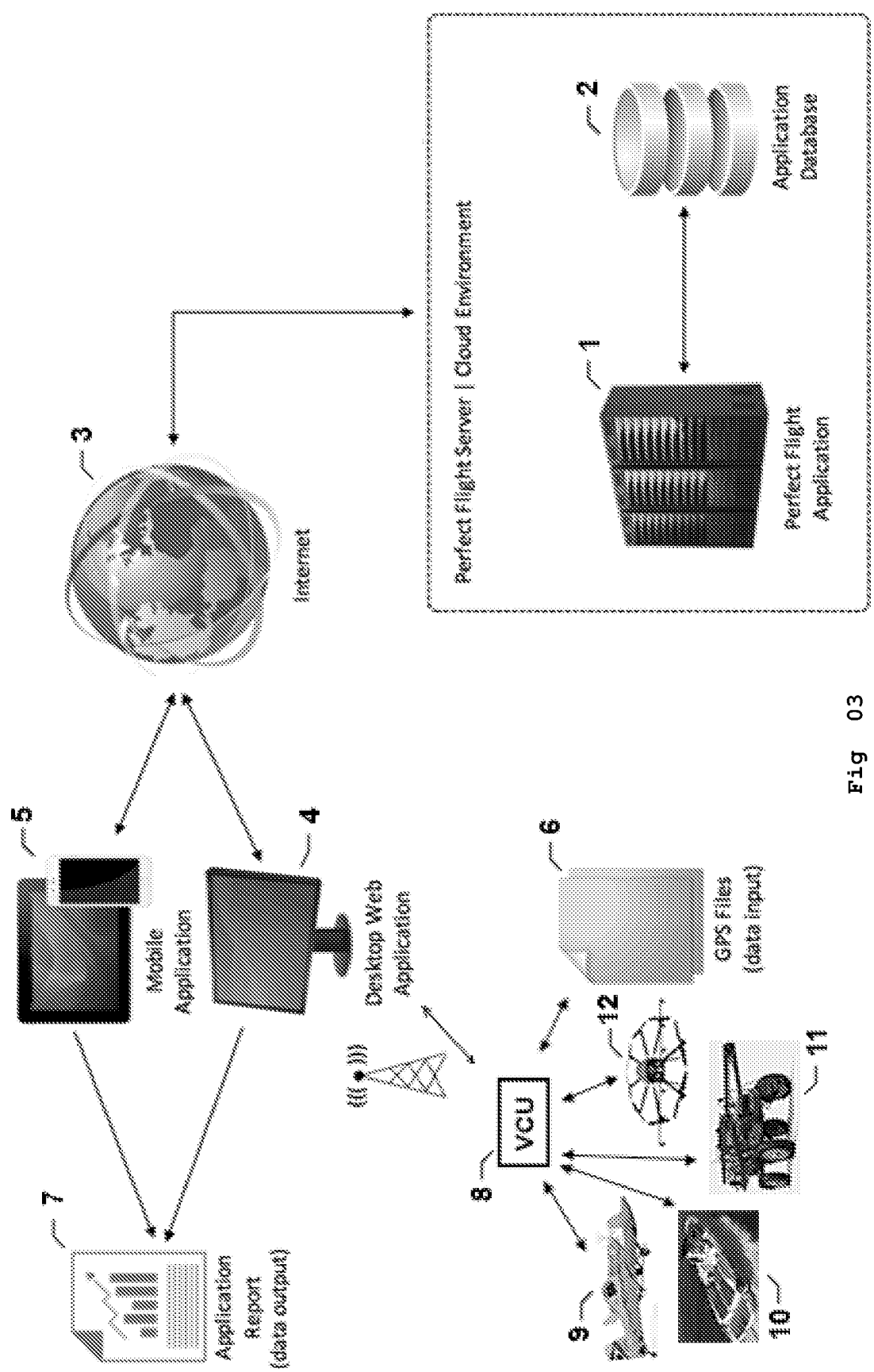
FIG. 3 shows the overall system architecture of the second embodiment of the present invention.

The diagram shown in FIG. 3 related with a second embodiment of the present invention describes how the application works and its parts and how each part connect with the others.

There is a web server running the Perfect Flight application (1). This web server also provides file system storage for the application.

There is a database application (2) responsible for all the information used in this application. This database server can be running inside the same physical server (1) or in another one.

The internet (3) is the provided communication method between the Perfect Flight (1) cloud environment and its end users. Other remote communication systems can be used such radio communication systems.

This application can be accessed by desktop computers (4) or mobile devices (5) running web browsers. In this desktop (4) or mobile devices (5) access it is possible to upload the GPS collected (6) files containing all the information necessary to control the vehicle (9-12) and generate the final application report (7) through the vehicle control unit (8) that connects with the desktop (4) or mobile devices (5) by a remote communication system protocol.

A vehicle control unit (8) embedded in the vehicle (9-12) is responsible by the navigation of this vehicle and the control of the chemical product application. The vehicle control unit (8) uses the GPS device information to guarantee its geolocation and pathway that is real time informed to the Perfect Flight application (1) that monitor and adjust the vehicle position and pathway and the chemical product application procedure based in the data provided by the user.

GPS device from where GPS files (6) are collected by the vehicle control unit (8). It may be generated by GPS embedded into agricultural aircrafts (9), boats (10), tractors (11) or drones (12). These files are used as input data for generating the final application reports (7) and to guide the vehicle control unit in the vehicle pathway.

The final product of this process is the final application report (7), which contains all detailed information about how much product was applied and in which areas (plots) on the ground. It also contains a financial information about the relation between products/dosage/costs for this application.

The report also shows a success rate for the application. The report information's are: property name, pilot, aircraft, total costs, success costs, application's beginning/ending date and time, average application speed, application spray width, total traveled distance, total plots area, total application area, external application costs, application rate, overlap area, success area, external area, not covered area and success rate.

Figure 4:
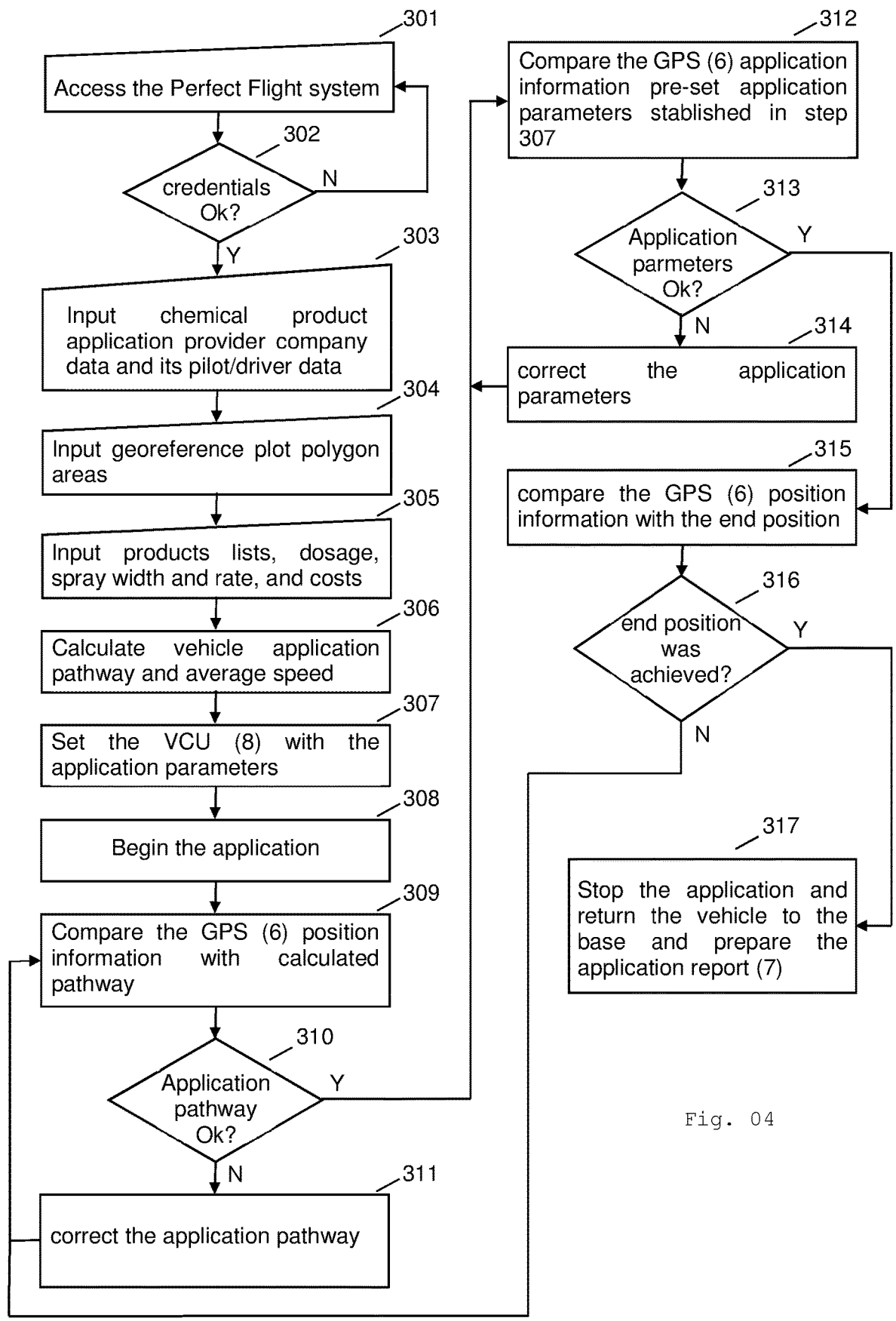
FIG. 4 show a detailed step by step flow chart of a chemical product application and report generation.

FIG. 4 is a detailed step by step chemical product application and report generation flow. It describes how all the needed information is gathered and how the calculations are made in order to manage the chemical product application by means a vehicle (9-12) and generate the final report (7) that constitutes a method for control and audit the chemical products application made by a vehicle.

To use the Perfect Flight system, in this second embodiment, the user must follow some steps.

First, step (301), the user, from desktop computers (4) or mobile devices (5), must access the Perfect Flight application (1) URL of the web system and provide his credentials (e-mail address and password) to login to the system. The system will then check, step (302), for the credentials and provide access in case it has been successfully validated or deny access backing to the previous step.

Inside the web system, step (303), the user must register his chemical product application provider companies and its pilots/drivers.

In the step (304), the user must register the georeferenced parameters of his farm properties or area where the chemical product will be applied detailing which plots the chemical product application have to be done. The system will load, from the desktop web application (4) to the Perfect Flight Application (1) through the internet (3), each plot polygon area, based on previously georeferenced imported files.

In the step (305), the user must register the list of each chemical product to be applied, dosage, spray width and rate, and costs.

In the step (306), the Perfect Flight application (1) calculates the chemical product application vehicle (9-12) pathway and its average speed.

In the step (307), the Perfect Flight application (1) sets the vehicle control unit (8) with the chemical product application parameters such application pathway, average speed, dosage, spray width and rate.

After all the chemical product application parameters be set the vehicle (9-12) is ready to begin the chemical product application, step (308).

Once initiated the application, in the step (309), the Perfect Flight application (1) monitor the GPS (6) information, by a pre-configured time, and, with this information, compare the vehicle (9-12) position with the application pathway calculated in the step (306).

If, step (310), the vehicle is going in the correct pathway, the vehicle (9-12) maintain its way, otherwise, the Perfect Flight application (1), step (311), send a command to the vehicle control unit (8) to correct the application pathway.

Based on the GPS (6) information, in the step (312), the Perfect Flight application (1) compare the chemical product application parameters that are being sprayed with the pre-set parameters from step (307).

If, step (313), the applications parameters that are being sprayed are not in accordance with the parameters stablished on step (307), the Perfect Flight application (1), in the step (314), will correct the application parameters to the parameters from step (307). Otherwise, will continue with the chemical product application.

Finally, in the step (315), the Perfect Flight application (1) compare the GPS (6) position information and check if the application pathway arrived to the end position.

If, step (316), the end position was achieved, the chemical product application is stopped and the vehicle (9-12) returns to the base, step (317), and the Perfect Flight application (1) process the steps (101) to (126) to generates the application report (7), otherwise, continue with the chemical product application.

The invention claimed is:

1. A system for control and audit of application of chemical products made by a vehicle comprising:
a web server configured to execute an application (1) and provide a file system storage for the application;
a database application (2) in a physical server which comprises information for the application;
an internet (3) which is configured to allow communication between the application (1) in a cloud environment and a plurality of users;
a desktop computer (4) or mobile device (5) configured to execute a web browser to access the application (1), wherein the accessing of the application (1) further comprises uploading GPS files which comprise information to control a vehicle (9), and the vehicle control unit (8) is configured to connect to the desktop computer (4) or mobile device (5) through a communication system protocol and wherein, the application (1) is configured to register georeferenced parameters of farm properties or an area where the chemical product application will be applied, and includes the plots in which the chemical product application will be done, and the application (1) is configured to load from the desktop computer (4) or the mobile device (5) through the internet (3), each plot polygon area, based on previously georeferenced imported files;
the application (1) is configured to calculate a chemical product application vehicle (9) pathway and an average speed of the chemical product application vehicle (9) pathway;
the application (1) is configured to set the vehicle control unit (8) with chemical product application parameters comprising an application pathway, an average speed, dosage, spray width, and rate;
the application (1) is configured to monitor information of the GPS files (6), at pre-configured times, and, with the information of the GPS files (6), is configured to compare the vehicle (9) position with a calculated pathway of the chemical application vehicle (9) pathway;
the vehicle control unit (8) is embedded in the vehicle (9) and is configured to perform navigation of the vehicle (9) and/or control of application of a chemical product, wherein the vehicle control unit (8) is configured to use GPS device information to provide real time vehicle geolocation data and real time pathway data to the application (1), and the application (1) is configured to monitor and adjust a vehicle position and a vehicle pathway and/or the chemical product application based on data;
the vehicle (9) is configured so that if the vehicle is going on the calculated pathway, the vehicle (9) maintains the vehicle pathway, and the application (1) is configured to send a command to the vehicle control unit (8) to return the vehicle to the calculated pathway if the vehicle is not going on the calculated pathway;

the vehicle control unit (8) is configured to collect GPS files (6) from a GPS device embedded in the vehicle (9), wherein the GPS files (6) are generated by the GPS and guidance by the vehicle control unit (8) of the vehicle pathway and the vehicle control unit (8) is configured to perform navigation of the vehicle (9) and control of application of a chemical product;

the application (1) is configured to read as input a list of each of the chemical product application to be applied, dosage, spray width and rate, and costs;

the application (1) is configured to compare the information of values from the GPS files (6) of chemical product application parameters as the chemical product is being applied with pre-set parameters of the chemical product application, and wherein the application (1) is configured so that if the chemical product application parameters as the chemical product is being applied are not in accord with the pre-set chemical product application parameters, then the application (1) signals the vehicle control unit (8) to correct the chemical product application parameters as the chemical product is being applied to the pre-set chemical product application parameters, otherwise the application (1) continues;

the application (1) is configured to compare the GPS files (6) position information and is configured to check if the application pathway has arrived at an end position, and if the end position is achieved, the chemical product application is stopped, otherwise the application (1) continues with the chemical product application;

the application (1) is configured so that, if the end position is reached, the vehicle controller (8) controls the vehicle (9) to return to a base; and wherein the vehicle is an aircraft.

2. The system of claim 1, wherein the vehicle control unit (8) is configured to generate a final application report (7).

3. The system of claim 2, wherein the GPS files (6) are input data for the vehicle control unit (8) which is configured to generate the final application report (7).

4. The system of claim 3, wherein the final application report (7) comprises detailed information about one or more of property name, pilot, aircraft, total costs, success costs, application's beginning/ending date and time, average application speed, application spray width, total traveled distance, total plots area, total application area, external application costs, application rate, overlap area, success area, external area, not covered area, how much of the chemical product application was applied and to which areas (plots) on the ground the chemical product application was applied, and financial information about a relation between products/dosage/costs for the chemical product application.

5. The system of claim 1, wherein the desktop computer (4) or the mobile device (5) is configured to access the application (1) URL of a web system and provide credentials to log in.

6. The system of claim 1, wherein the application (1) is configured to check for user credentials and configured to provide access if the credentials are successfully validated or deny access to the system and return to a previous step if the credentials are not successfully validated.

7. A method for control and audit of application of chemical products made by vehicles a vehicle comprising:

executing an application (1) and providing a file system storage for the application;

communicating between the application (1) in a cloud environment and a plurality of users;

executing a web browser to access the application (1), wherein the accessing of the application (1) further comprises uploading GPS files which comprise information to control a vehicle (9) and generate a final application report (7) through a vehicle control unit (8), and the vehicle control unit (8) is connected to the desktop computer (4) or mobile device (5) through a communication system protocol;

performing navigation of the vehicle (9) and/or controlling of application of a chemical product, wherein the vehicle control unit (8) uses GPS device information to provide real time vehicle geolocation data and real time pathway data to the application (1), and the application (1) monitors and adjusts a vehicle position and a vehicle pathway and/or the chemical product application based on data;

collecting GPS files (6) from a GPS device embedded in the vehicle (9), wherein the GPS files (6) are generated by the GPS and the GPS files (6) are input data for guidance by the vehicle control unit (8) of the vehicle pathway;

accessing the application (1) URL of a web system and providing credentials comprising an e-mail address and password to login to the system from the desktop computers (4) or the mobile devices (5);

registering georeferenced parameters of farm properties or an area where the chemical product application will be applied, at the application (1), and the area includes the plots in which the chemical product application will be done, and the system loads, from the desktop computer (4) or mobile device (5) to the application (1) through the internet (3), each plot polygon area, based on previously georeferenced imported files;

calculating a chemical product application vehicle (9) pathway and an average speed of the chemical product application vehicle (9) pathway at the application (1);

setting the vehicle control unit (8) with chemical product application parameters comprising an application pathway, an average speed, dosage, spray width, and rate at the application (1);

beginning the application by the vehicle (9) after all the chemical product application parameters are set;

monitoring information of the GPS files (6) by the application (1), at pre-configured times, and, with the information of the GPS files (6), comparing the vehicle (9) position with the calculated chemical application vehicle (9) pathway;

maintaining the vehicle (9) pathway if the vehicle is going on a correct pathway, otherwise sending a command to the vehicle control unit (8) by the application (1) to correct the chemical application vehicle (9) pathway;

comparing the values of chemical product application parameters as the chemical product is being applied with the parameters pre-set in the application (1) based on the information of the GPS files (6);

if, as the chemical product is being applied, the chemical product application parameters are not in accord with the pre-set chemical product application parameters, correcting the chemical product application parameters by the application (1), otherwise continuing the application;

comparing the GPS files (6) position information and checking if the application pathway has arrived at an end position; and if the end position is achieved, stopping the chemical product application, otherwise the application (1) continues with the chemical product application;
wherein the vehicle is an aircraft.

8. The method of claim 7, that further comprises generating final application report (7) from data input into the application (1) by the user and input into GPS files (6) and input into the vehicle control unit (8), and data from the application (1), GPS files (6) and vehicle control unit (8) collected during the vehicle movement.

9. The method of claim 8, wherein the final application report includes detailed information comprising property name, pilot, aircraft, total costs, success costs, application's beginning/ending date and time, average application speed, application spray width, total traveled distance, total plots area, total application area, external application costs, application rate, overlap area, success area, external area, not covered area and success rate.

10. The method of claim 7, further comprising, before the step of executing a web browser to access the application (1), a step of checking for user credentials and if the credentials are successfully validated then providing access to the system or if the credentials are not successfully validated, denying access to the system and returning to a previous step.

* * * * *